(12) United States Patent
Kim et al.

(10) Patent No.: US 9,686,005 B2
(45) Date of Patent: Jun. 20, 2017

(54) METHOD AND APPARATUS FOR FEEDING BACK CHANNEL ESTIMATION IN MULTI-INPUT MULTI-OUTPUT SYSTEM

(71) Applicants: Samsung Electronics Co., Ltd., Gyeonggi-do (KR); Industry-Academic Cooperation Foundation, Yonsei University, Seoul (KR)

(72) Inventors: Younsun Kim, Gyeonggi-do (KR); Sooyong Choi, Seoul (KR); Taehyoung Kim, Seoul (KR); Kyungsik Min, Seoul (KR); Jungkyun Park, Seoul (KR); Juho Lee, Gyeonggi-do (KR); Hyojin Lee, Gyeonggi-do (KR); Minchae Jung, Seoul (KR); Hyoungju Ji, Seoul (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 89 days.

(21) Appl. No.: 14/765,192

(22) PCT Filed: Jan. 29, 2014

(86) PCT No.: PCT/KR2014/000839
§ 371 (c)(1),
(2) Date: Jul. 31, 2015

(87) PCT Pub. No.: WO2014/119922
PCT Pub. Date: Aug. 7, 2014

(65) Prior Publication Data
US 2015/0372741 A1    Dec. 24, 2015

(30) Foreign Application Priority Data

Jan. 31, 2013 (KR) .......................... 10-2013-0011306

(51) Int. Cl.
*H04B 7/06* (2006.01)
*H04B 7/0413* (2017.01)
(Continued)

(52) U.S. Cl.
CPC ......... *H04B 7/0632* (2013.01); *H04B 7/0413* (2013.01); *H04B 7/0452* (2013.01);
(Continued)

(58) Field of Classification Search
CPC .. H04B 7/0617; H04B 7/0626; H04B 7/0456; H04B 7/15578; H04B 7/0639; H04L 25/0204; H04L 1/0026
See application file for complete search history.

(56) References Cited

U.S. PATENT DOCUMENTS

2010/0306613 A1    12/2010 Wu et al.
2011/0149765 A1*    6/2011 Gorokhov ............. H04L 1/0026
                                                                   370/252
(Continued)

FOREIGN PATENT DOCUMENTS

WO    WO 2011/100822    8/2011

OTHER PUBLICATIONS

PCT/ISA/210 Search Report issued on PCT/KR2014/000839 (pp. 3).
(Continued)

*Primary Examiner* — Jung Park
(74) *Attorney, Agent, or Firm* — The Farrell Law Firm, P.C.

(57) ABSTRACT

Disclosed are a method and an apparatus for feeding back channel estimation in a MIMO system. A terminal receives a reference signal for estimating a channel from a base station; estimates the channel based on the reference signal; generates channel estimation information according to the channel estimation result and generates error information
(Continued)

indicating an error of the channel estimation; and transmits feedback information including the channel estimation information and the error information to the base station.

20 Claims, 5 Drawing Sheets

(51) Int. Cl.
*H04B 7/0452* (2017.01)
*H04B 7/0456* (2017.01)
*H04L 1/06* (2006.01)
*H04L 1/00* (2006.01)
*H04W 88/08* (2009.01)

(52) U.S. Cl.
CPC ......... *H04B 7/0456* (2013.01); *H04B 7/0617* (2013.01); *H04B 7/0639* (2013.01); *H04B 7/0641* (2013.01); *H04L 1/0026* (2013.01); *H04L 1/0029* (2013.01); *H04L 1/0072* (2013.01); *H04L 1/0078* (2013.01); *H04L 1/06* (2013.01); *H04W 88/08* (2013.01)

(56) References Cited

U.S. PATENT DOCUMENTS

| | | |
|---|---|---|
| 2011/0237282 A1* | 9/2011 | Geirhofer .............. H04B 7/024 455/509 |
| 2012/0275313 A1 | 11/2012 | Prasad et al. |
| 2012/0287799 A1 | 11/2012 | Chen et al. |
| 2012/0300868 A1 | 11/2012 | Chen et al. |
| 2013/0022139 A1* | 1/2013 | Chen ................... H04B 7/0663 375/260 |

OTHER PUBLICATIONS

PCT/ISA/237 Written Opinion issued on PCT/KR2014/000839 (pp. 7).

ZTE, "Possible reasons for diverse evaluation results in DL MIMO enchancement SI", R1-124821, 3GPP TSG RAN WG1 Meeting #71, New Orleans, USA, Nov. 12-16, 2012.

Texas Instruments, "On further downlink MIMO enhancements for LTE-Advanced", R1-124747, 3GPP TSG RAN WG1 Meeting #71, New Orleans, USA, Nov. 12-16, 2012.

* cited by examiner

| M | $B^{PMI}$ | CEE 0 | CEE 1 |
|---|---|---|---|
| 8 | 4 | 0.6932 | 0.5240 |
| 16 | | 0.8381 | 0.7305 |
| 32 | | 0.9169 | 0.8564 |
| 8 | 5 | 0.6308 | 0.4761 |
| 16 | | 0.8019 | 0.6984 |
| 32 | | 0.8974 | 0.8380 |
| 8 | 6 | 0.5727 | 0.4319 |
| 16 | | 0.7665 | 0.6674 |
| 32 | | 0.8780 | 0.8197 |

[a]

| M | $B^{PMI}$ | CEE 00 | CEE 01 | CEE 10 | CEE 11 |
|---|---|---|---|---|---|
| 8 | 4 | 0.7481 | 0.6576 | 0.5599 | 0.4330 |
| 16 | | 0.8651 | 0.8061 | 0.7424 | 0.6520 |
| 32 | | 0.9295 | 0.8955 | 0.8576 | 0.8026 |
| 8 | 5 | 0.6847 | 0.5993 | 0.5128 | 0.3970 |
| 16 | | 0.8292 | 0.7724 | 0.7116 | 0.6253 |
| 32 | | 0.9104 | 0.8769 | 0.8399 | 0.7863 |
| 8 | 6 | 0.6244 | 0.5470 | 0.4687 | 0.3631 |
| 16 | | 0.7935 | 0.7394 | 0.6815 | 0.5990 |
| 32 | | 0.8911 | 0.8585 | 0.8225 | 0.7701 |

METHOD AND APPARATUS FOR FEEDING BACK CHANNEL ESTIMATION IN MULTI-INPUT MULTI-OUTPUT SYSTEM

TECHNICAL FIELD

The present invention relates to a method and an apparatus for feeding back channel estimation in a Multi-Input Multi-Output (MIMO) system, and more particularly, to a method and an apparatus, which estimates a Channel Quality Indicator (CQI) by reflecting a channel estimation error generated by switching a Single User MIMO (SU-MIMO) mode and a Multi User MIMO (MU-MIMO) mode in a wireless communication system supporting MIMO.

BACKGROUND ART

An MIMO system supports an MU-MIMO transmission mode in order to increase a throughput of a wireless communication system. Unlike an SU-MIMO which corresponds to a transmission mode supporting a single user, the MU-MIMO technology refers to a technology of simultaneously supporting a plurality of users to use the same frequency (or time) resource. Currently, a transmission mode for the MU-MIMO is defined in both of a Long Term Evolution (LTE) communication environment and an LTE-Advanced (LTE-A) communication environment.

Recently, a Massive MIMO system, which supports tens to hundreds of antennas of a base station, has been spotlighted. The Massive MIMO system corresponds to a next generation wireless communication technology which increases the number of antennas of the base station, to secure a space resource, so as to dramatically improve a cell throughput. The existing MU-MIMO supports an MU-MIMO maximally having 2 layers in the LTE environment, and supports an MU-MIMO maximally having 8 layers in the LTE-A environment. However, the Massive MIMO aims to support an MU-MIMO having 10 to 30 layers according to increased space resources. The 3GPP which is a mobile communication standard organization also calls the Massive MIMO a Full-Dimension MIMO (FD-MIMO).

DISCLOSURE OF INVENTION

Technical Problem

The transmission mode of the MIMO wireless communication system is determined based on channel information which a terminal feeds back to the base station. In detail, the terminal feeds back Pre-coding Matrix Indicator (PMI) information and Channel Quality Indicator (CQI) information to the base station. Also, the terminal may further transmit Rank Indicator (RI) information as feedback information.

However, the channel information, which the terminal feeds back, is estimated based on assumption that the system operates in the SU-MIMO transmission mode, so that an error may be generated when such channel information is used in the MU-MIMO transmission mode.

Solution to Problem

The present invention has been made to solve the above mentioned problems in the conventional art, and an aspect of the present invention is to provide a method and an apparatus, which can obtain an optimal system throughput in a system operating in an MU-MIMO mode, by solving a CQI mismatching problem according to the MU-MIMO transmission mode.

In accordance with an aspect of the present invention, a method of feeding back channel estimation of a terminal in a MIMO system is provided. The method includes receiving a reference signal for estimating a channel from a base station; estimating the channel based on the reference signal; generating channel estimation information according to the channel estimation result, and generating error information indicating an error of the channel estimation; and transmitting feedback information including the channel estimation information and the error information to the base station.

In accordance with another aspect of the present invention, a method of receiving channel estimation feedback of a base station in a MIMO system is provided. The method includes transmitting a reference signal for channel estimation of a terminal to the terminal; receiving feedback information including channel estimation information generated based on the reference signal and error information indicating an error of the channel estimation, from the terminal; estimating channel quality information of the terminal by applying the error information to the channel estimation information; and transmitting data scheduled based on the estimated channel quality information, to the terminal.

In accordance with another aspect of the present invention, an apparatus for feeding back channel estimation of a MIMO system is provided. The apparatus includes a reception unit that receives a reference signal for channel estimation from a base station; a channel estimation unit that estimates a channel based on the reference signal; a feedback information generation unit that generates channel estimation information according to the channel estimation result, and generates error information indicating an error of the channel estimation; and a feedback transmission unit that transmits feedback information including the channel estimation information and the error information, to the base station.

In accordance with another aspect of the present invention, an apparatus for receiving channel estimation feedback of a MIMO system is provided. The apparatus includes a transmission unit that transmits a reference signal for channel estimation of a terminal to the terminal; a feedback information reception unit that receives feedback information including channel estimation information generated based on the reference signal and error information indicating an error of the channel estimation, from the terminal; a channel quality estimation unit that estimates channel quality information of the terminal by applying the error information to the channel estimation information; and a scheduling unit that transmits data scheduled based on the estimated channel quality information, to the terminal.

Advantageous Effects of Invention

The present invention makes a proposal such that each terminal feeds back Channel Estimation Error (CEE) information, in order to estimate a Multiple User CQI (MU-CQI) more accurately. The MU-CQI estimation based on the fed back CEE information enables a user to estimate the MU-CQI with higher accuracy, as compared with the related art. When scheduling and MU-MIMO transmission is performed based on the estimated MU-CQI, a user can acquire a multi-user diversity higher than that of the related art and can achieve a maximum system throughput.

BRIEF DESCRIPTION OF DRAWINGS

The above and other objects, features and advantages of the present invention will be more apparent from the following detailed description in conjunction with the accompanying drawings, in which.

MODE FOR THE INVENTION

Hereinafter, various embodiments of the present invention will be described in detail with reference to the accompanying drawings. In the following description of the present disclosure, a detailed description of known functions and configurations incorporated herein will be omitted when it may make the subject matter of the present disclosure rather unclear. Terms described later are defined in consideration of functions of the present invention, but may vary according to the intention or convention of a user or operator. Accordingly, the terms should be defined based on the contents over the whole present specification.

Further, when embodiments of the present invention are described in detail, a wireless communication system based on an Orthogonal Frequency Division Multiplexing (OFDM) scheme, and especially, a 3GPP Evolved Universal Terrestrial Radio Access (3GPP EUTRA) standard will be described as a main subject. However, the subject matter of the present invention may be slightly varied and then be applied to other communication systems having similar technical backgrounds and channel formation without largely departing from the scope of the present invention, and the variations may be made by determination of those skilled in the art to which the present invention pertains.

Figure 1:
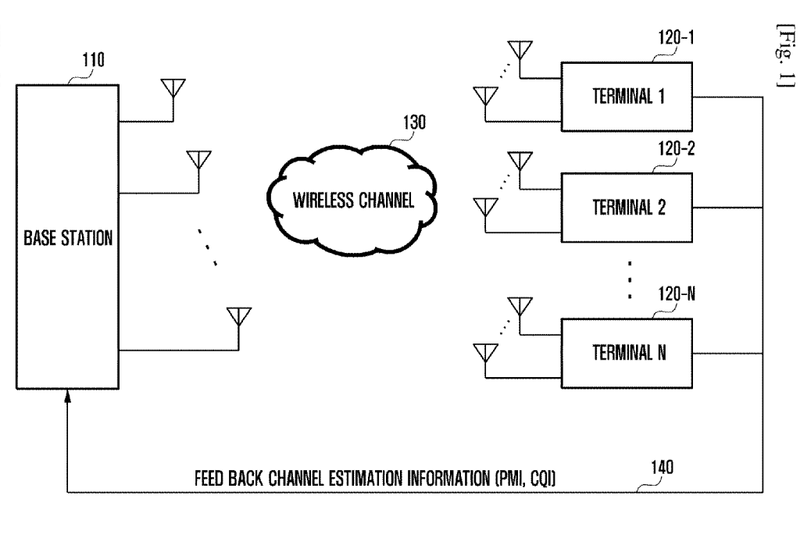
FIG. 1 illustrates an MIMO system based on feedback according to the related art.

FIG. 1 illustrates an MIMO system based on feedback according to the related art. In particular, FIG. 1 illustrates an MU-MIMO system in which a base station supports a plurality of users.

Referring to FIG. 1, N terminals 120-1 to 120-N estimate downlink channels through a Channel State Information Reference Signal (CSI-RS) received from a base station 110 through a wireless channel 130, and then quantize the estimated downlink channels to a PMI and a CQI which are previously defined, to feed back the quantized result to the base station, as indicated by reference numeral 140.

The PMI is determined as an index of a codeword most approximate to the channel which the terminal estimates. The base station and the terminal share an appointed codebook with each other, and the terminal calculates which codeword of the codebook is used for pre-coding when the highest channel gain is obtained. At this time, the channel gain is calculated based on assumption that the system operates in an SU-MIMO mode. The terminal feeds back an index of a codeword which generates the highest channel gain, i.e. has the highest reception Signal to Interference Noise Ratio (SINR), to the base station.

The CQI is determined according to a channel gain value obtained when the base station performs transmitting based on a codeword which the terminal determines in consideration of a state of the channel. At this time, the terminal calculates a Signal-to-Noise Ratio (SNR) based on assumption that the system operates in the SU-MIMO mode, and determines a Modulation Coding Scheme (MCS) in consideration of a Block Error Rate (BLER). The determined MCS is one of values of a MCS table which is previously defined. The terminal feeds back an index CQI of the determined MCS table to the base station. Further, the CQI is determined based on assumption that the PMI which the terminal transmits is applied. That is, the terminal generates the CQI based on assumption that the base station performs pre-coding by using the PMI of which the terminal notifies the base station.

The base station performs scheduling based on information (e.g. the PMI and the CQI) fed back from the terminal, and determines a transmission pre-coder and a transmission mode. As mentioned above, the transmission mode includes the SU-MIMO mode and the MU-MIMO mode.

In the MU-MIMO transmission mode, a plurality of user shares the same resource with each other, so that interference between the users occurs. The interference between the users is controlled through proper pre-coding. The pre-coding technique includes a codebook-based pre-coding technique which uses a codeword corresponding to the PMI fed back from the terminal as it is, and a non-codebook-based pre-coding technique which reprocesses the codeword corresponding to the PMI fed back from the terminal to determine a pre-coder.

Further, the base station reconverts the CQI based on the CQI fed back from the terminal according to the transmission mode. In the SU-MIMO mode, the CQI fed back from each of terminals is used as a Single User CQI (SU-CQI) as it is. However, in the MU-MIMO mode, the base station estimates a Multi User CQI (MU-CQI) from the SU-CQI fed back from the terminal, according to the pre-coding technique and the number of users who perform co-scheduling, and then transmits data to the terminal according to the MCS corresponding to the estimated MU-CQI.

However, when the base station estimates the MU-CQI based on the channel information fed back from the terminal, i.e. the SU-CQI, there is an error between the MU-CQI estimated from the base station and the MU-CQI which the terminal can support when receiving the MU-MIMO transmission. This is referred to as CQI mismatch.

When the MU-CQI is estimated to be higher than the actual MU-CQI, the BLER which each of the terminals requires is not satisfied, so that it is difficult to secure transmission quality. Further, when the MU-CQI is estimated to be lower than the actual MU-CQI, the transmission quality is secured but the transmission is performed with a transmission rate lower than channel capacity which can be actually performed, so as to deteriorate frequency efficiency. Thus, it is important to estimate a value similar to the actual MU-CQI.

In particular, in the Massive MIMO system, an amount of the channel information which should be estimated for the terminal increases according to the increase in the number of the antennas of the base station. Thus, when the quantization is performed by the codebook configured by the limited number of feedbacks, a very large CEE occurs. Thus, the channel information fed back from the base station has a considerable error as compared with the actual channel, so that when the MU-CQI of each of the users is estimated, the CQI mismatch problem is deepened.

The present invention is made to solve a problem of the CQI mismatch which may be generated when transmission is performed in the MU-MIMO transmission mode as described above, and has a configuration in which feedback information which the terminal transmits to the base station includes the CEE information.

The CEE is a value indicating a degree of a difference between an actual wireless channel and channel information of which the terminal notifies the base station in a form of a quantized PMI. That is, the terminal measures the actual wireless channel to select a PMI designating a pre-coding matrix which most accurately matches with the measured actual wireless channel, and generates a degree of a quantization error between the actual wireless channel and the pre-coding matrix which the PMI designates, in a form of the CEE, to include the degree of the quantization error in feedback information transmitted to the base station.

The base station may determine which MCS level is used when the MU-MIMO transmission to the terminal is performed by using the CQI and the PMI included in the feedback information which the terminal transmits and by using the CEE for the CQI and the PMI. In this way, the system which considers the CEE when determining the MCS level of the terminal may have a more excellent performance than that of a system which does not consider the CEE when determining the MCS level of the terminal.

Figure 2:
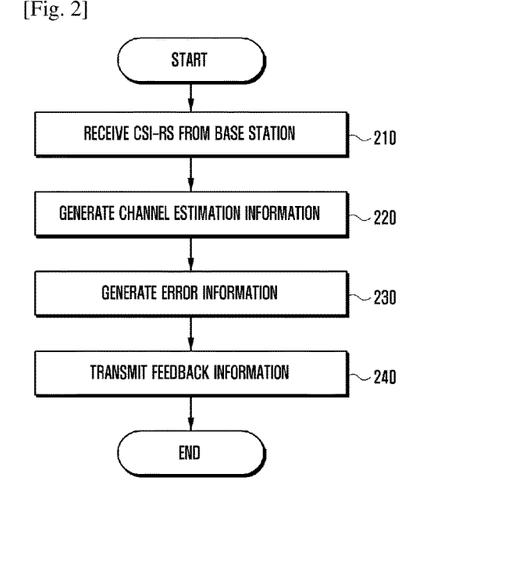
FIG. 2 is a flowchart illustrating a process in which a terminal transmits feedback information including channel estimation information to a base station according to an embodiment of the present invention.

FIG. 2 is a flowchart illustrating a process in which a terminal transmits feedback information including channel estimation information to a base station according to an embodiment of the present invention.

In step 210, a terminal receives a CSI-RS which is a reference signal for estimating a channel, from a base station. Next, in step 220, the terminal estimates a channel based on the CSI-RS and generates a PMI and a CQI as channel estimation information. As described above, the PMI and the CQI are quantization values which are previously defined.

In order to determine the PMI which is quantized channel information, a codebook may be previously defined by Equation (1).

MathFigure 1

[Math.1]

$$F=\{w_1, w_2, \ldots, w_L\}, L=2^B, B: \text{\# of feedback bits} \quad (1)$$

The terminal selects a codeword in the codebook of Equation (1), which satisfies a condition of Equation (2), as the PMI.

MathFigure 2

[Math. 2]

$$PMI: j^* = \underset{1 \le j \le L}{\operatorname{argmax}} |h_k w_j|, \text{Selected codeword: } w_k = w_{j^*} \quad (2)$$

In step 230, the terminal generates CEE, which corresponds to error information, from the PMI value determined by Equation (2). Hereinafter, a process of generating the CEE will be described in detail.

The CEE is defined as an error between a normalized actual channel and a quantized channel. In more detail, the CEE corresponds to a value obtained by performing inner-product of a vector of the actual channel and a vector of the quantized channel. The error between the normalized actual channel and the quantized channel may be calculated by Equation (3).

MathFigure 3

[Math.3]

$$CEE: \epsilon_k = 1 - |\tilde{h}_k w_k|^2 = \sin^2\theta_k \quad \text{where} \quad \tilde{h}_k = h_k/\|h_k\|, \theta_k = \angle(\tilde{h}_k, w_k) \quad (3)$$

Here, $\epsilon k$ denotes an error between channels, hk denotes a normalized actual channel, and wk denotes a quantized channel.

The CEE is defined as a scalar value as described in Equation (3). At this time, when a statistical characteristic of the CEE is known, the CEE value may be quantized by an existing quantization scheme such as a Lloyd-Max algorithm. The quantization scheme is not limited to the Lloyd-Max algorithm, and any other existing quantization schemes may be applied as the quantization scheme.

Further, a quantization level is determined by the number of bits allocated for the CEE among the feedback information transmitted to the base station. At this time, the number of CEE feedback bits is properly determined in consideration of a trade-off between an overhead and a performance of the system.

FIGS. 3A to 3B illustrate CEE codebooks defined for CEE quantization according to an embodiment of the present invention.

Figure 3:
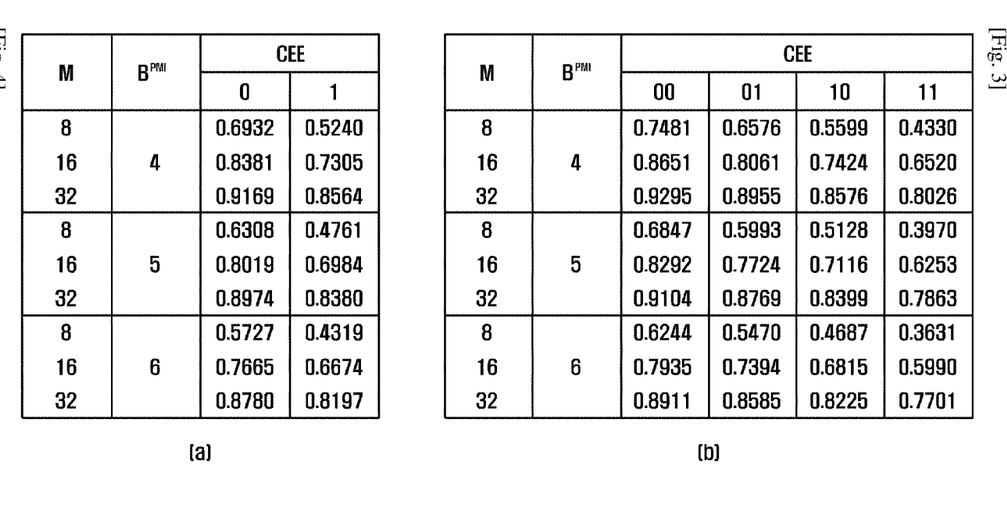
FIGS. 3A to 3B illustrate CEE codebooks defined for CEE quantization according to an embodiment of the present invention.

Referring to FIG. 3, a quantized CEE value is determined by the number M of antennas of the base station, the number BPMI of bits of feedback information allocated to a PMI, and the number BCEE of bits of feedback information allocated to a CEE. FIG. 3A is a codebook when BCEE is 1 bit, and FIG. 3B is a codebook when BCEE is 2 bits.

In an embodiment of the present invention, the terminal previously stores CEE codebooks according to the M, the BPMI, and the BCEE, and selects a proper codebook according to a state of the base station to which the terminal is currently connected through higher signaling, to quantize the CEE.

Referring back to FIG. 2, the terminal transmits the PMI and the CQI which are channel estimation information generated in step 220 and the feedback information including the CEE which is error information estimated in step 230, to the base station, in step 240. At this time, the terminal may allocate the number of bits, which is previously determined, among the feedback information transmitted to the base station, in order to transmit the CEE.

Figure 4:
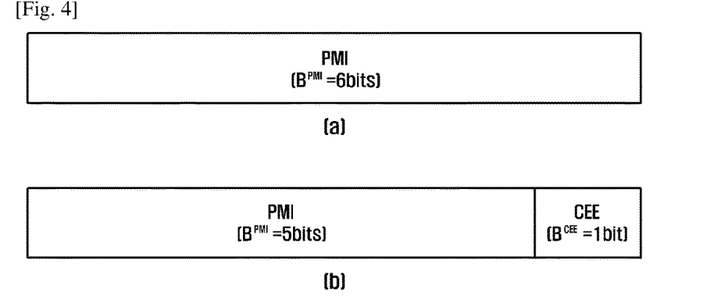
FIGS. 4A to 4B illustrate structures of feedback information transmitted from a terminal to a base station according to a first embodiment of the present invention.

FIGS. 4A to 4B illustrate structures of feedback information transmitted from a terminal to a base station according to a first embodiment of the present invention. FIG. 4A illustrates a structure of feedback information according to the related art, and the structure includes PMI information formed with 6 bits. FIG. 4B illustrates a structure of feedback information including a CEE formed with 1 bit according to a first embodiment of the present invention, and 1 bit among the bits for the PMI according to the related art is allocated for the CEE.

In this way, the present invention uses the number of feedback bits which is equal to that of the related art, so that the same overhead is secured. That is, in the first embodiment of the present invention, 1 bit among the PMI feedback bits of the related art is allocated as a feedback bit for the CEE, so as to aim at accuracy of the MU-CQI estimation in the base station.

The related art allocates more bits to the PMI, so that accuracy of the fed back channel information increases. However, there are disadvantages in that searching for a codebook in the terminal is complex and the CQI mismatch is generated to a high degree. Meanwhile, the feedback structure of the present invention has a relatively small BPMI, so that accuracy of the fed back channel information decreases. However, there are advantages in that the searching for a codebook in the terminal is simple, and the CEE feedback helps the base station to estimate the MU-CQI more accurately, so as to improve a throughput of the actual system, as compared with the related art.

FIGS. 5A to 5B illustrate structures of a wideband channel and a subband channel according to a second embodiment of the present invention.

Figure 5:
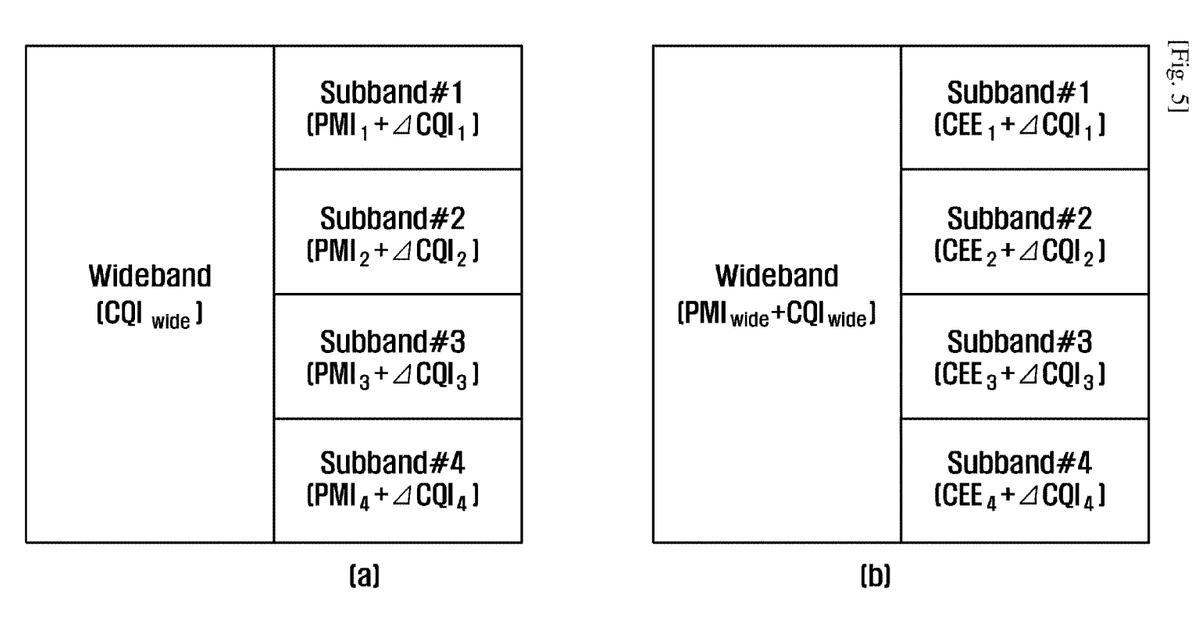
FIGS. 5A to 5B illustrate structures of a wideband channel and a subband channel according to a second embodiment of the present invention.

Referring to FIG. 5, a feedback structure illustrated in FIG. 5A is configured by CQI information CQIwide for a wideband, and PMIs PMIk (k denotes an index of a subband) and differential CQIs ΔCQIk for each subband.

Meanwhile, a feedback structure illustrated in FIG. 5B according to a second embodiment of the present invention is configured by PMI information PMIwide and CQI information CQIwide for a wideband, and CEEk and ΔCQIk for each subband, in order to improve estimation accuracy of the MU-CQI in the base station and to reduce a feedback overhead.

The feedback structure according to the second embodiment of the present invention has an advantage in that an overhead according the PMI feedback for each subband is largely reduced, and an MU-CQI for each subband is more accurately estimated through the CEE feedback, as compared with the related art, so as to perform effective scheduling.

Figure 6:
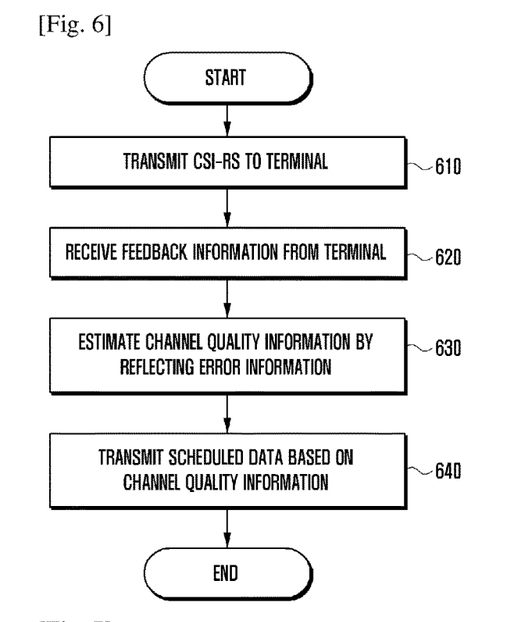
FIG. 6 is a flowchart illustrating a process in which a base station transmits data based on feedback information received from a terminal according to an embodiment of the present invention.

FIG. 6 is a flowchart illustrating a process in which a base station transmits data based on feedback information received from a terminal according to an embodiment of the present invention.

In step 610, a base station transmits a CSI-RS which is a reference signal for estimating a channel, to a terminal. Next, in step 620, the base station receives feedback information from the terminal. The feedback information includes a PMI and a CQI corresponding to channel estimation information and a CEE corresponding to error information which are generated by the terminal according to the process illustrated in FIG. 2.

In step 630, the base station determines an MCS level for the terminal based on the feedback information. In detail, the base station estimates an SINR by reflecting the CEE corresponding to the error information, which is included in the feedback information transmitted by the terminal, and estimates an MU-CQI which corresponds to the SINR.

As described above, the CQI which the terminal feeds back to the base station is estimated based on assumption that the system operates in the SU-MIMO transmission mode, so that the base station may estimate a CQI in the MU-MIMO transmission mode by reflecting the CEE to the CQI fed back. As an embodiment, the base station may estimate the SINR by using Equation (4).

MathFigure 4

[Math. 4]

$$SINR_k^{est} = \frac{CQI^{SU}}{K + CQI^{SU}\left(\sum_{j=1, j \neq k}^{K}|c_k^T c_j^*|^2 + \left(\frac{\varepsilon_k}{1-\varepsilon_k}\right)\left(\frac{K-1}{M-1}\right)\right)} \quad (4)$$

Here, CQISU denotes a CQI fed back by the terminal, and ϵk denotes a CEE value fed back by the terminal.

Meanwhile, when there is no CEE information fed back from the terminal, the base station may estimate an MU-CQI by applying an average value of the CEE instead of the CEE value currently fed back.

The base station estimates the MU-CQI from the SINR calculated by Equation (4), and determines an MCS level corresponding to the estimated MU-CQI.

In step 640, the base station transmits data scheduled according to the determined MCS level, to the terminal. At this time, the base station may transmit the determined MCS level to the terminal through a Physical Downlink Control Channel (PDCCH) or higher signaling.

As described above, in an embodiment of the present invention, the base station estimates the MU-CQI based on the PMI, the CQI, and the CEE information. The MU-CQI estimated by reflecting the CEE has a value which is closer to an actual MU-CQI value than the MU-CQI estimated not by reflecting the CEE. Accordingly, the channel may be effectively utilized, so as to improve a throughput of the system. Further, when performing scheduling, the base station may perform the scheduling through the more accurate MU-CQI, to acquire a higher diversity than that of the related art.

Further, the CEE feedback technology proposed above may be equally applied even when the terminal transmits PMIs for a plurality of layers.

The mobile communication system such as LTE/LTE-A may utilize a plurality of transmitting/receiving antennas in the base station and the terminal, to transmit and receive a plurality of spatial layers which are divided spatially. In this case, when feeding back the PMIs for the N layers, the terminal may feed back one CEE value for the N layers to the base station or may feed back a separate CEE value for each of the N layers to the base station.

Another method used when the terminal feeds back the PMIs for the plurality of layers to the base station is feeding back M CEEs for the N layers. Here, M is a natural number equal to or smaller than N. That is, each of CEEs may provide information on one or more layers, and the CEE allocated to each of the layers may be determined to be mutually exclusive.

Figure 7:
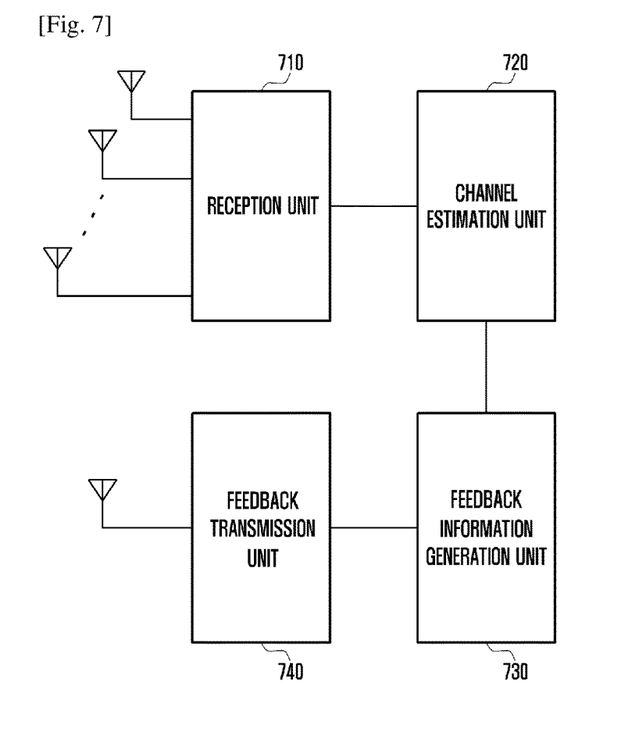
FIG. 7 illustrates a structure of a device for feeding back channel estimation information, i.e. a terminal, according to an embodiment of the present invention.

FIG. 7 illustrates a structure of a device for feeding back channel estimation information, i.e. a terminal, according to an embodiment of the present invention. Referring to FIG. 7, the terminal may include a reception unit 710, a channel estimation unit 720, a feedback information generation unit 730, and a feedback transmission unit 740.

The reception unit 710 may receive a downlink channel from the base station, and may receive a downlink channel through a plurality of antennas according to the MIMO transmission mode. Especially, the reception unit 710 receives a CSI-RS from the base station in order to estimate a state of the channel to feed back the estimated state to the base station.

The channel estimation unit 720 estimates a channel from the received CSI-RS. The feedback information generation unit 730 generates a quantized PMI and a quantized CQI which correspond to channel estimation information and a quantized CEE which corresponds to error information, based on the channel estimation result. A detailed description of a method of generating channel estimation information and feedback information will be omitted since the above-described method may be equally applied thereto.

The feedback transmission unit 740 transmits the generated feedback information to the base station.

Figure 8:
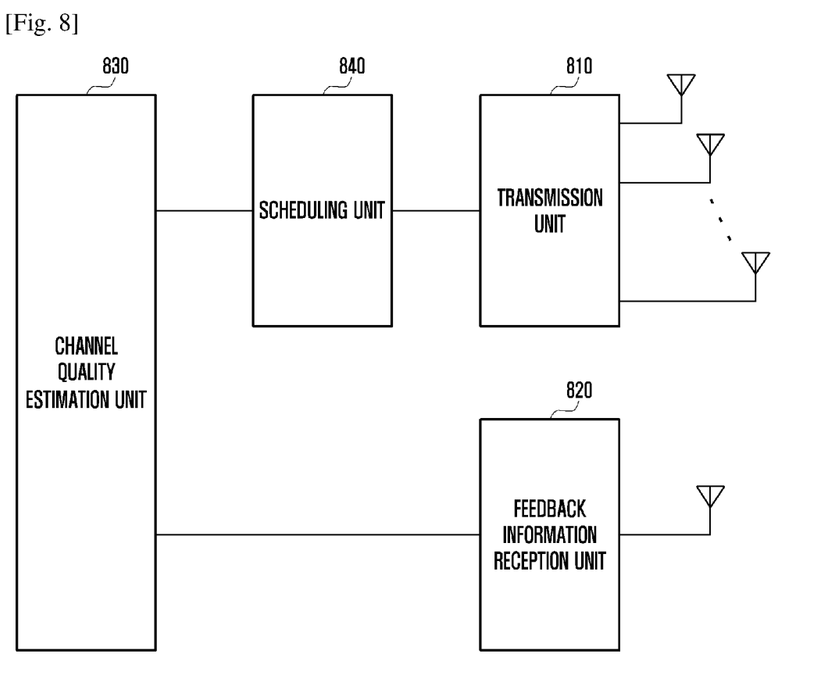
FIG. 8 illustrates a structure of a device for transmitting scheduled data based on fed back information, i.e. a base station, according to an embodiment of the present invention.

FIG. 8 illustrates a structure of a device for transmitting scheduled data based on fed back information, i.e. a base station, according to an embodiment of the present invention. Referring to FIG. 8, the base station may include a transmission unit 810, a feedback information reception unit 820, a channel quality estimation unit 830, and a scheduling unit 840.

The transmission unit 810 transmits a downlink channel to the terminal. At this time, the transmission unit 810 may transmit a downlink channel through a plurality of transmitting antennas according the MIMO transmission scheme. Especially, the transmission unit 810 may transmit a CSI-RS for estimating a channel of the terminal.

The feedback information reception unit 820 receives the feedback information transmitted from the terminal. The feedback information includes the PMI, the CQI, and the CEE as described above. The channel quality estimation unit 830 estimates an MU-CQI based on the received feedback information, and determines an MCS level for the terminal according to the estimated MU-CQI. A detailed description of the channel quality estimation will be omitted since the above-described method may be equally applied thereto.

The scheduling unit 840 performs scheduling according the determined MCS level, and transmits data to the terminal through the transmission unit 810.

Those skilled in the art can appreciate that it is possible to implement the present invention in another specific form without changing the technical idea or the indispensable characteristics of the present invention. Therefore, it should be understood that the above-described embodiments are illustrative and are not limiting under any possible interpretation. The scope of the present disclosure is defined by the appended claims to be described later, rather than the detailed description. Accordingly, it should be appreciated that all modifications or variations derived from the meaning and scope of the appended claims and their equivalents are included in the range of the present disclosure.

Meanwhile, although exemplary embodiments of the present invention have been shown and described in this specification and the drawings, they are used in general sense in order to easily explain technical contents of the present invention, and to help comprehension of the present invention, and are not intended to limit the scope of the present invention. It is obvious to those skilled in the art to which the present invention pertains that other modified embodiments on the basis of the spirits of the present invention besides the embodiments disclosed herein can be carried out.

The invention claimed is:

1. A method of feeding back channel estimation of a terminal in a Multi-Input Multi-Output (MIMO) system, the method comprising:
   receiving a reference signal for estimating a channel from a base station;
   estimating the channel based on the reference signal;
   generating channel estimation information according to the channel estimation result, and generating error information indicating an error of the channel estimation; and
   transmitting feedback information including the channel estimation information and the error information to the base station,
   wherein the error information is determined based on a number of antennas, a number of bits of a precoding matrix index (PMI) of the feedback information, and a number of bits of the error information.

2. The method of claim 1, wherein the error information corresponds to an error between a quantized channel determined by the channel estimation and an actual wireless channel.

3. The method of claim 1, wherein the error information is quantized based on a codebook predetermined according to the number of bits allocated for the error information in the feedback information.

4. The method of claim 1, wherein a part of bits previously allocated for the channel estimation information is allocated for the error information again, in the feedback information.

5. The method of claim 1, wherein the feedback information comprises the PMI and a Channel Quality Indicator (CQI) for a wideband, error information for each subband, and a differential value of the CQI.

6. A method of receiving channel estimation feedback of a base station in a MIMO system, the method comprising:
   transmitting a reference signal for channel estimation of a terminal to the terminal;
   receiving feedback information including channel estimation information generated based on the reference signal and error information indicating an error of the channel estimation, from the terminal;
   estimating channel quality information of the terminal by applying the error information to the channel estimation information; and
   transmitting data scheduled based on the estimated channel quality information, to the terminal,
   wherein the error information is determined based on a number of antennas, a number of bits of a precoding matrix index (PMI) of the feedback information, and a number of bits of the error information.

7. The method of claim 6, wherein the error information corresponds to an error between a quantized channel determined by the channel estimation and an actual wireless channel.

8. The method of claim 6, wherein the error information is quantized based on a codebook predetermined according to the number of bits allocated for the error information in the feedback information.

9. The method of claim 6, wherein a part of bits previously allocated for the channel estimation information is allocated for the error information again, in the feedback information.

10. The method of claim 6, wherein the feedback information comprises the PMI and a CQI for a wideband, error information for each subband, and a differential value of the CQI.

11. An apparatus for feeding back channel estimation of a MIMO system, the apparatus comprising:
   a reception unit that receives a reference signal for channel estimation from a base station;
   a channel estimation unit that estimates a channel based on the reference signal;

a feedback information generation unit that generates channel estimation information according to the channel estimation result, and generates error information indicating an error of the channel estimation; and a feedback transmission unit that transmits feedback information including the channel estimation information and the error information, to the base station, wherein the error information is determined based on a number of antennas, a number of bits of a precoding matrix index (PMI) of the feedback information, and a number of bits of the error information.

12. The apparatus of claim 11, wherein the error information corresponds to an error between a quantized channel determined by the channel estimation and an actual wireless channel.

13. The apparatus of claim 11, wherein the error information is quantized based on a codebook predetermined according to the number of bits allocated for the error information in the feedback information.

14. The apparatus of claim 11, wherein a part of bits previously allocated for the channel estimation information is allocated for the error information again, in the feedback information.

15. The apparatus of claim 11, wherein the feedback information comprises the PMI and a CQI for a wideband, error information for each subband, and a differential value of the CQI.

16. An apparatus for receiving channel estimation feedback of a MIMO system, the apparatus comprising:

a transmission unit that transmits a reference signal for channel estimation of a terminal to the terminal;

a feedback information reception unit that receives feedback information including channel estimation information generated based on the reference signal and error information indicating an error of the channel estimation, from the terminal;

a channel quality estimation unit that estimates channel quality information of the terminal by applying the error information to the channel estimation information; and a scheduling unit that transmits data scheduled based on the estimated channel quality information, to the terminal, wherein the error information is determined based on a number of antennas, a number of bits of a precoding matrix index (PMI) of the feedback information, and a number of bits of the error information.

17. The apparatus of claim 16, wherein the error information corresponds to an error between a quantized channel determined by the channel estimation and an actual wireless channel.

18. The apparatus of claim 16, wherein the error information is quantized based on a codebook predetermined according to the number of bits allocated for the error information in the feedback information.

19. The apparatus of claim 16, wherein a part of bits previously allocated for the channel estimation information is allocated for the error information again, in the feedback information.

20. The apparatus of claim 16, wherein the feedback information comprises the PMI and a CQI for a wideband, error information for each subband, and a differential value of the CQI.

* * * * *